US012702599B2

(12) United States Patent
Schrag

(10) Patent No.: US 12,702,599 B2
(45) Date of Patent: Aug. 11, 2026

(54) HEALTHCARE BED SHEET SYSTEM

(71) Applicant: Oscar Schrag, Brooklyn, NY (US)

(72) Inventor: Oscar Schrag, Brooklyn, NY (US)

( * ) Notice: Subject to any disclaimer, the term of this patent is extended or adjusted under 35 U.S.C. 154(b) by 0 days.

(21) Appl. No.: 18/660,300

(22) Filed: May 10, 2024

(65) Prior Publication Data

US 2024/0374443 A1 Nov. 14, 2024

Related U.S. Application Data

(60) Provisional application No. 63/501,206, filed on May 10, 2023.

(51) Int. Cl.
*A61G 1/01* (2006.01)
*A47G 9/02* (2006.01)
*A61G 1/048* (2006.01)

(52) U.S. Cl.
CPC ............ *A61G 1/01* (2013.01); *A47G 9/0238* (2013.01); *A61G 1/048* (2013.01)

(58) Field of Classification Search
CPC ......... A61G 1/01; A61G 1/048; A61G 7/1026
See application file for complete search history.

(56) References Cited

U.S. PATENT DOCUMENTS

2018/0193213 A1* 7/2018 Spahn ...................... B32B 5/26
2023/0064553 A1* 3/2023 Fogel .................... A61F 13/513

* cited by examiner

*Primary Examiner* — Adam C Ortiz
(74) *Attorney, Agent, or Firm* — Howard University School of Law IP Patent Clinic; Lyssa-Michelle Morris

(57) ABSTRACT

A bed sheet system includes a textile material having a left side and a right side and a top surface and a bottom surface; on the top surface having tubes formed of the sheet material extending along a length of the textile material; the tubes being disposed along the left side and right of the textile material; each of the tubes on the left and right sides having at least one pocket; whereas a strap made of textile material is threaded within the pockets on each side creating a handle system.

14 Claims, 4 Drawing Sheets

HEALTHCARE BED SHEET SYSTEM

CROSS-REFERENCE TO RELATED APPLICATIONS

This application claims priority to provisional application App. No. 63/501,206, filed May 10, 2023, the contents are incorporated by references herein.

FIELD

The field of disclosure generally relates to a bed sheet system, and more specifically, to a sheet system transferring of patients in healthcare settings.

BACKGROUND

Hospice care focuses on a person's quality of life as they near the end of life. Palliative care is also called supportive care, symptom management, or comfort care. Palliative care can be given along with treatment to people who are not in hospice care, but also is part of hospice care. Hospice and palliative care both try to provide a better quality of life and relief from symptoms and side effects for people with a serious illness. Both have special care teams that address a person's physical, emotional, mental, social, and spiritual needs.

Hospice patients spend the majority of their time in bed. As a result, hospice patients often need to be moved within their bed for purposes of changing clothes, inserting IVs, or changing bedpans. Hospice is generally care that comforts and supports patients and their families when a life-limiting illness no longer responds to cure-oriented treatments. Unfortunately, moving hospice patients is often difficult a process. Moving hospice patients in healthcare settings or home to transfer patients from a bed to a stretcher or wheelchair can be physically challenging and emotional for the hospice patient. Additionally, hospice bed sheets are generally uncomfortable for hospice patients confined to their bed.

SUMMARY

In light of the foregoing background, the following presents a simplified summary of the present disclosure to provide a basic understanding of some aspects of the disclosure. This summary is not an extensive overview of the disclosure. It is not intended to identify key or critical elements of the disclosure, or to delineate the scope of the disclosure. The following summary merely presents some concepts of the disclosure in a simplified form as a prelude to the more detailed description provided below.

Aspect of the present disclosure pertains to abed sheet system, that has handles and pockets for convenient transferring of patients that additionally allows for storage of items.

Aspects of the present disclosure relate to abed sheet system. The aspects of the technology provide a sheet system for hospice patients and the like. The sheet system provides one elastic webbed band on each of its vertical sides. The sheet also has an embedded cut out opening. The bands are separated by seams and serve as handles to easily transport hospice patients in and out of their beds. The openings in between the handles and the seam serve as pockets for individuals such as health care workers and patients to store items. The sheet is designed to easily move patients and avoid disruption with the cords the patient might be connected to while lying in their hospital bed. The sheet handles are embedded within the sheet and do not stand alone on the sheet's outer edge.

In one aspect of the disclosure, a sheet includes a textile material having a left side and a right side and a top surface and a bottom surface; on the top surface having tubes formed of the sheet material extending along a length of the textile material; the tubes being disposed along the left side and right of the textile material; each of the tubes on the left and right sides having at least one pocket; whereas a strap made of textile material is threaded within the pockets on each side creating a handle system.

In one aspect of the disclosure, the sheet material includes at least one handle is connected to the sheet by way of a threading system forming a lifting support mechanism.

In one aspect of the disclosure, the sheet material includes at least one pocket formed therein.

In one aspect of the disclosure, a sheet includes a handle system comprising embedded nylon straps within exposed openings.

In one aspect of the disclosure, a sheet includes a textile material having a first side edge and a second side edge; within the edges there is a pocket system through which a strap made of nylon material is threaded.

In one aspect of the disclosure, a sheet includes a textile material further comprises a cotton material.

BRIEF DESCRIPTION OF THE DRAWINGS

The foregoing summary as well as the following detailed description of the invention, considered in conjunction with the accompanying drawings, provides a better understanding of the disclosure, in which like reference numbers refer to like elements, and wherein.

DETAILED DESCRIPTION

The foregoing and other features and advantages will be apparent from the following more particular description of exemplary embodiments of the disclosure. The drawings are not necessarily to scale, with emphasis instead being placed upon the principles of the disclosure.

Figure 1:
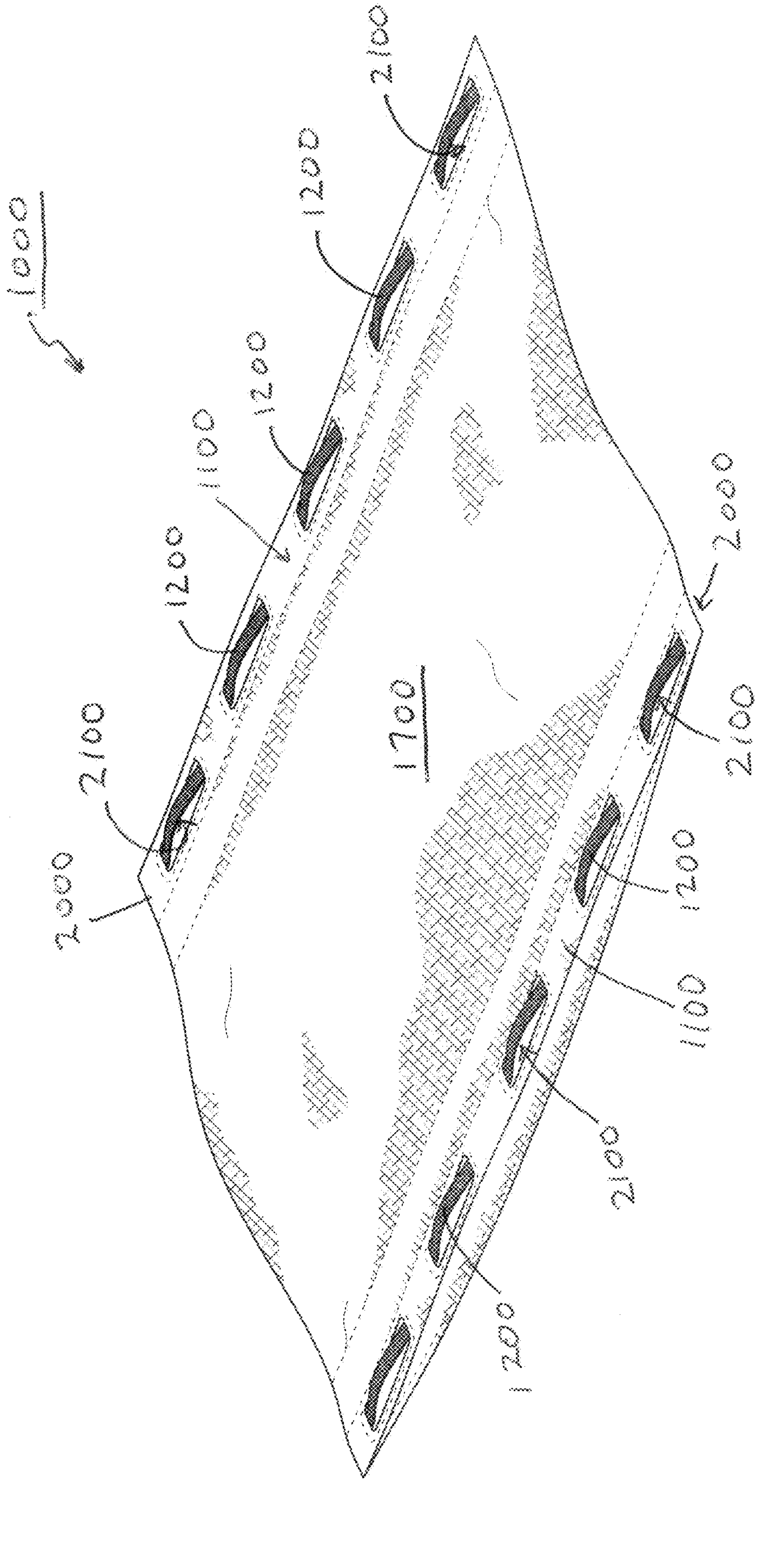
FIG. 1 shows a schematic perspective view of a sheet according to various aspects and teachings of the present disclosure.
Figure 2:
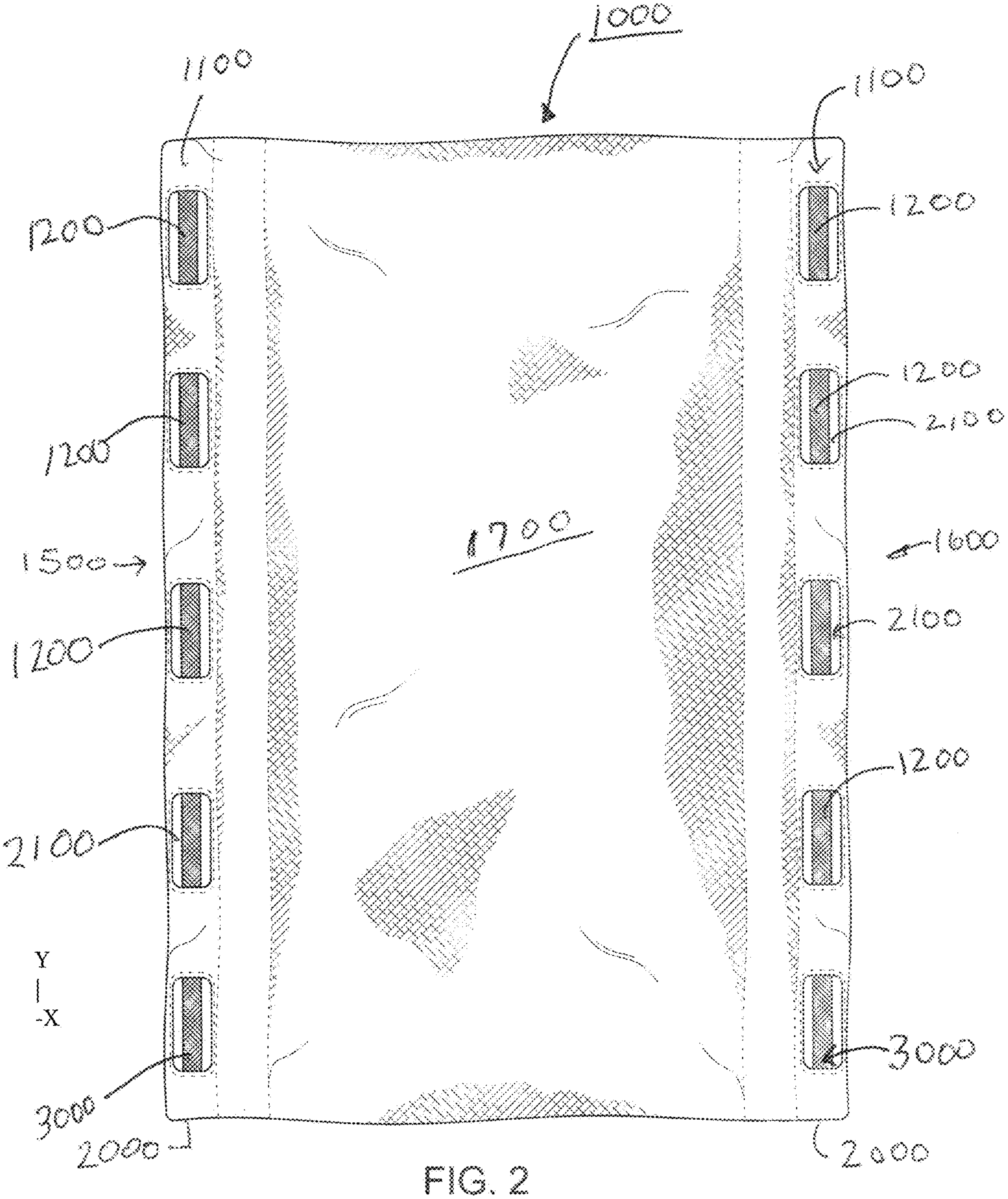
FIG. 2 shows a schematic top plan view of a sheet according to various aspects and teachings of the present disclosure.
Figure 3:
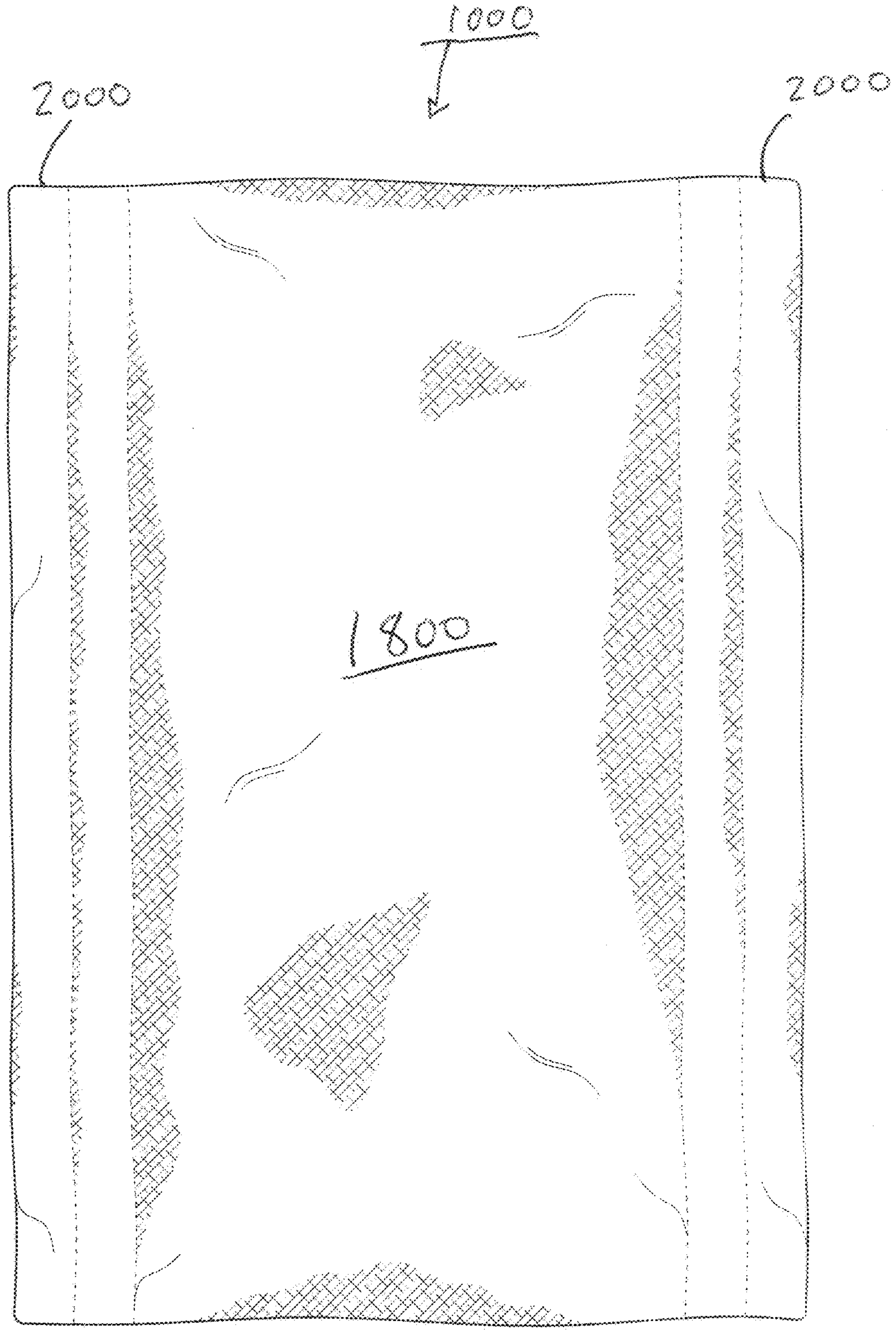
FIG. 3 illustrates a schematic bottom plan view of a sheet according to various aspects and teachings of the present disclosure.
Figure 4:
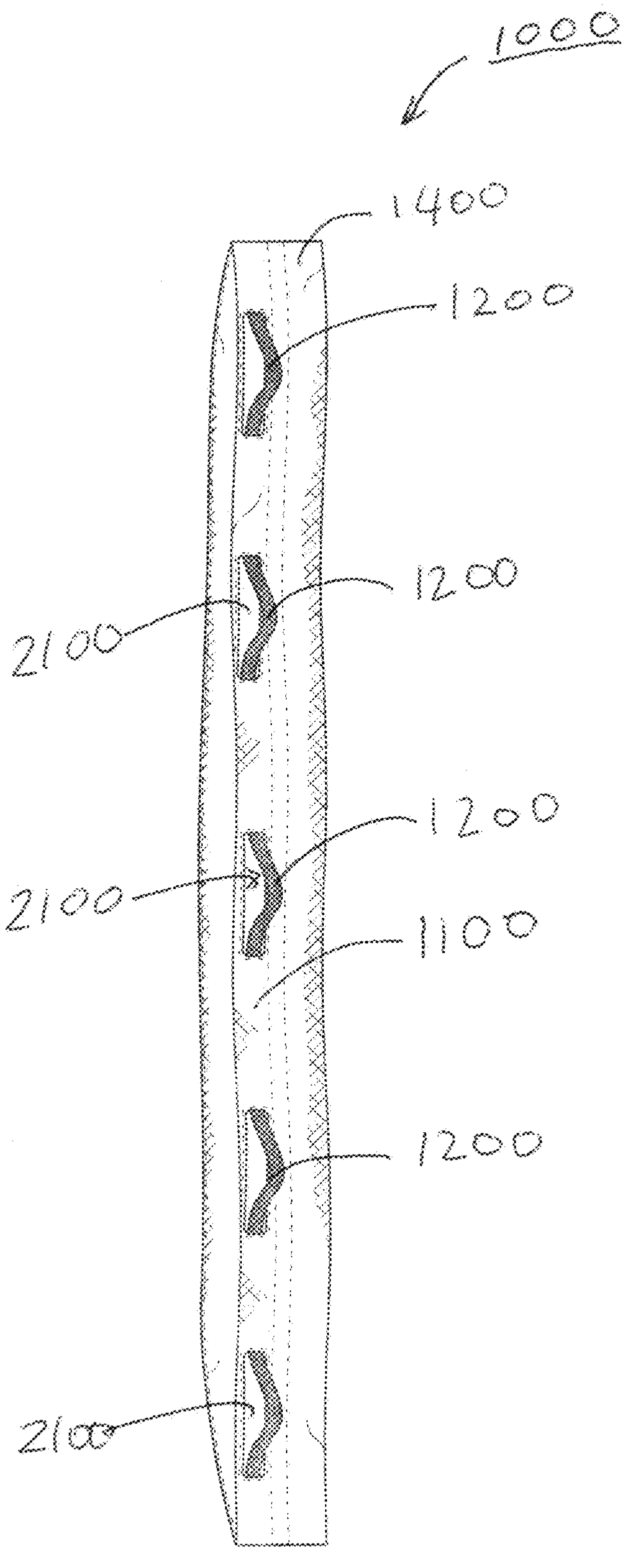
FIG. 4 shows a schematic side elevational view of a sheet according to various aspects and teachings of the present disclosure.

In the present disclosure, FIGS. 1 through 4 illustrate features of a bed sheet system 1000. In accordance with an aspect of the present disclosure, bed sheet system 1000 may include a rectilinear frame 1100 and at least one handle 1200 one each side of the frame 1100 and parallel to the frame 1100. The handle 1200 may be adjacent to a pocket 1300. The technology provides a healthcare bed sheet system 1000 for patients, such as in a hospice care. Hospice patients can be moved within their bed for purposes of changing clothes, inserting IVs, or changing bedpans with less resistance. The present disclosure enables caregivers to move hospice patients with sheets in healthcare settings to transfer patients from one surface to another, such as from a bed to a stretcher or wheelchair with generally ease to provide a better quality of life and relief from symptoms and side effects for people with a serious illness.

The system 1000 has one elastic webbed band 3000 servings as handles 1200 on each of its vertical sides 1400. The sheet also has an embedded cut out opening serves a pocket configuration 2100. The bands are separated by seams and serve as handles to easily transport hospice patients in and out of their beds. The openings in between the handles and the seam serve as pockets for individuals such as health care workers and patients to store items. The sheet system 1000 is designed to easily move patients and avoid disruption with the cords form IVs and monitor metrics the patient might be connected to while lying in their hospital bed. The system 1000 provides for the comfort and well-being of the individual. The handles 1200 provides support for caregivers to regularly repositioning and monitoring of the patient's comfort levels to prevent discomfort or pressure sores.

In one construction referring to FIGS. 1-4, a bed sheet system 1000 includes a textile material having a left side 1500 and a right side 1600 and a top surface 1700 and a bottom surface; on the top surface 1700 having tubes 2000 formed of the sheet material extending along a length of the textile material. In at least one construction, the tubes 2000 may be formed via overlapping edges of the textile material and then bonding/sewn the edged together by joining methods, such as stitching, chemical fusing, or adhesive bonding. In this way, a tubular configuration of tubes may be formed with a single seam extending along the length of the sheet 1000 from the first free end to the second free end.

In at least one construction, the tubes 2000 are disposed along the left side 1500 and right side 1600 of the textile material such as a shape recovery fabric. In at least one construction, each of the tubes on the left side 1500 and right side 1600 have at least one pocket 2100 formed therein; whereas a long strap 3000 made of a textile webbing material is threaded within the pockets 2100 on each side 1500, 1600 creating a handle system configuration. In one construction, the sheet material includes at least one handle 1200 connected to the sheet by way of a threading system forming a lifting support mechanism. In one construction, the sheet material includes at least one pocket 2100 formed therein.

In one construction referring to FIGS. 1-4, a bed sheet system 1000 includes a handle system with frame 1100 comprising embedded nylon straps 3000 within exposed openings. In one construction, a sheet includes a textile material having a first side edge 1500 and a second side edge 1600; within the edges there is a pocket system 2100 through which a strap 3000 made of nylon material is threaded. The sheet includes a textile material further comprises a cotton material and/or a shape recovery fabric.

As used herein a "shape recovery fabric" is a fabric that can be placed in tension and upon release, the fabric springs back to its original shape. In one case, a shape recovery fabric may be stretched linearly 50%-60% along a planar axis and return to its original shape. In a preferred arrangement, a shape recovery fabric may be implemented which has a blend of substantially inelastic material and elastic fibers. For example, the inelastic material may comprise cotton. Nevertheless, other inelastic fibers may be implemented in the shape recovery fabric.

The elastic fibers may comprise material sold under the LYCRA® brand. LYCRA® is a trademark of the DuPont Corporation for its brand of a family of premium elastane fiber. In a preferred embodiment, the shape recovery material may include a blend of approximately 98% cotton and 2% elastic fibers or other fabric blends having 2% elastic fibers. There are a variety of stretch fabric with weave patterns and weights that may be implemented. In one exemplary case, a stretch fabric with a weight about 12 oz. per square yard may be used to construct sheet system 1000 or strap 3000. Other ranges of the weight can be less than 12 oz.

The shape recovery fabric may also be constructed in a range of weave and knitting patterns to adjust the direction and amount of the elasticity. Accordingly, in one construction, a shape recovery fabric for the system 1000 may have elastic fibers oriented more in a horizontal direction than in a vertical direction of the sheet 1000, that is, the material stretches more in one planar axis x-direction than in the other generally perpendicular planar axis—y-direction. In this configuration, the shape recovery material may have more oblique stretch to provide better control human movement control with sheet system 1000 for patient movement.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

It should be noted the terms "including" and "comprising" should be interpreted as meaning "including, but not limited to".

In this specification, "a" and "an" and similar phrases are to be interpreted as "at least one" and "one or more." References to "the," "said," and similar phrases should be interpreted as "the at least one", "said at least one", etc. References to "an" embodiment in this disclosure are not necessarily to the same embodiment. It is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A bed sheet system comprising:

a textile material having a left side, a right side, a top surface, and a bottom surface;

a plurality of tubes disposed on the top surface and being formed of a portion of the textile material extending along a length of the textile material, wherein a first tube of the plurality of tubes is disposed along the left side and a second tube of the plurality of tubes is disposed on the right side, wherein each of the plurality of tubes includes a plurality of pockets, and wherein each pocket of the plurality of pockets forms an opening at the top surface; and a plurality of straps corresponding to the plurality of tubes, each strap of the plurality of straps being threaded within the plurality of pockets of a corresponding tube of the plurality of tubes to create a handle system.

2. The bed sheet system according to claim 1, wherein the plurality of straps comprise a first strap threaded through the first tube and a second strap threaded through the second tube, wherein portions of the first strap are exposed through each pocket of the plurality of pockets of the first tube, wherein the exposed portions of the first strap form a plurality of handles connected to the textile material by way of a threading system collectively forming a lifting support mechanism.

3. The bed sheet system according to claim 1, wherein the plurality of pockets are aligned in each of the plurality of tubes.

4. The bed sheet system according to claim 1, wherein the textile material comprises a shape recovering material.

5. The bed sheet system according to claim 1, wherein the plurality of straps are composed of a shape recovering material.

6. The bed sheet system according to claim 4, wherein the shape recovery material comprises a cotton material and elastic fibers extending from the left side and the right side.

7. The bed sheet system according to claim 1, wherein the textile material further comprises a cotton material.

8. The bed sheet system according to claim 1, wherein each of the plurality of tubes is formed with stitching forming at least one seam of the respective tube.

9. The bed sheet system according to claim 2, wherein the plurality of straps are composed of a nylon material.

10. A bed sheet system comprising:

a textile material having a first side edge and a second side edge;

a pocket system comprising:

a first set of pockets within the first side edge, each pocket of the first set of pockets forming an opening on a top surface of the textile material, and a second set of pockets within the second side edge, each pocket of the second set of pockets forming an opening on the top surface of the textile material; and a handle system comprising:

a first strap made of nylon material and threaded through the first set of pockets, and a second strap made of the nylon material and threaded through the second set of pockets.

11. The bed sheet system according to claim 10, wherein the textile material comprises a cotton material.

12. The bed sheet system according to claim 10, wherein the textile material comprises a shape recovering material.

13. The bed sheet system according to claim 12, wherein the shape recovery material comprises a cotton material and elastic fibers extending from a left side and a right side of the textile material.

14. The bed sheet system according to claim 10, wherein the first strap and the second strap are each composed of a shape recovering material.

* * * * *